US010438326B2

(12) United States Patent
Yelton

(10) Patent No.: US 10,438,326 B2
(45) Date of Patent: Oct. 8, 2019

(54) RECURSIVE SUPPRESSION OF CLUTTER IN VIDEO IMAGERY

(71) Applicant: THE BOEING COMPANY, Chicago, IL (US)

(72) Inventor: Dennis J. Yelton, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 272 days.

(21) Appl. No.: 15/656,808

(22) Filed: Jul. 21, 2017

(65) Prior Publication Data

US 2019/0026868 A1 Jan. 24, 2019

(51) Int. Cl.
*G06K 9/36* (2006.01)
*G06T 5/00* (2006.01)
*G06T 5/10* (2006.01)

(52) U.S. Cl.
CPC .......... *G06T 5/002* (2013.01); *G06T 5/10* (2013.01); *G06T 2207/10016* (2013.01); *G06T 2207/10032* (2013.01); *G06T 2207/20048* (2013.01)

(58) Field of Classification Search
None
See application file for complete search history.

(56) References Cited

U.S. PATENT DOCUMENTS

| 4,654,665 A * | 3/1987 | Kiuchi ............... G01S 13/528 342/160 |
| 5,317,395 A * | 5/1994 | Carr ..................... H04N 5/33 348/164 |
| 5,341,142 A * | 8/1994 | Reis ................. F41G 7/2226 244/3.15 |
| 5,400,161 A | 3/1995 | Lambert, Jr. |
| 5,654,549 A | 8/1997 | Landecker et al. |

(Continued)

OTHER PUBLICATIONS

Video Snapshots: Creating high quality images from video clips, Kalyan Sunkavalli et al., IEEE, 1077-2626, 2012, pp. 1868-1879 (Year: 2012).*

(Continued)

*Primary Examiner* — Jayesh A Patel
(74) *Attorney, Agent, or Firm* — Womble Bond Dickinson (US) LLP

(57) ABSTRACT

A method of suppressing clutter in video imagery includes receiving video imagery from a focal plane array, and decomposing the video imagery into independently-moving coordinate transformations corresponding to clutter patterns that are subimages of the video imagery. The method also includes removing the subimages from an image of the video imagery to produce a clutter-suppressed version of the image, and rendering the clutter-suppressed version of the image. Removing the subimages from the image includes generating respective zeroth-order corrections for the subimages, and subtracting the respective zeroth-order corrections from the image. And removing the subimages includes recursively generating respective first-order corrections for the subimages from the respective zeroth-order corrections, and subtracting the respective first-order corrections from the image. The respective zeroth-order corrections are generated and subtracted from the image before the respective first-order corrections are generated and subtracted from the image.

27 Claims, 5 Drawing Sheets

(56) References Cited

U.S. PATENT DOCUMENTS

| | | | |
|---|---|---|---|
| 5,798,786 A | 8/1998 | Lareau et al. | |
| 5,894,323 A | 4/1999 | Kain et al. | |
| 5,903,659 A * | 5/1999 | Kilgore | G06T 5/20 |
| | | | 382/103 |
| 6,108,032 A | 8/2000 | Hoagland | |
| 6,211,515 B1 | 4/2001 | Chen et al. | |
| 6,373,522 B2 | 4/2002 | Mathews et al. | |
| 6,714,240 B1 * | 3/2004 | Caswell | H04N 5/33 |
| | | | 348/144 |
| 7,907,278 B1 * | 3/2011 | Williams | F41G 7/224 |
| | | | 356/305 |
| 8,553,113 B2 | 10/2013 | Ansari et al. | |
| 9,402,028 B2 | 7/2016 | Dopilka | |
| 9,646,388 B2 | 5/2017 | Paxton et al. | |
| 2005/0280707 A1 | 12/2005 | Sablak et al. | |
| 2006/0056724 A1 * | 3/2006 | Le Dinh | G06K 9/40 |
| | | | 382/274 |
| 2006/0251410 A1 | 11/2006 | Trutna, Jr. | |
| 2008/0118104 A1 | 5/2008 | Ariyur et al. | |
| 2011/0194734 A1 | 8/2011 | Gensolen et al. | |
| 2011/0226955 A1 | 8/2011 | Luty et al. | |
| 2013/0094694 A1 * | 4/2013 | Newman | G06T 7/254 |
| | | | 382/103 |
| 2014/0015921 A1 * | 1/2014 | Foi | H04N 5/21 |
| | | | 348/42 |

OTHER PUBLICATIONS

Extended European Search Report dated Dec. 5, 2018 in European application No. 18179938.8.

* cited by examiner

RECURSIVE SUPPRESSION OF CLUTTER IN VIDEO IMAGERY

TECHNOLOGICAL FIELD

The present disclosure relates generally to imaging and tracking and, in particular, to recursive suppression of clutter in video imagery.

BACKGROUND

Imaging and tracking systems typically include sensors to identify and track objects. For example, some sensors, such as radar systems, send out signals that reflect from objects and are received by the system. Other sensors, such as electro-optical sensors, receive electromagnetic radiation signals from the objects themselves. Improvements in this field have been directed to refining these sensors to be more accurate.

In particular, electro-optical sensors typically use telescopes and focal plane arrays that detect infrared radiation. Suppression of fixed pattern noise (FPN) is one area of development in electro-optical sensors. Generally, calibration or non-uniformity correction has been used to suppress fixed pattern noise. However, this method of fixed pattern suppression may leave a large residual fixed pattern which limits sensor performance and increases sensor noise levels, especially when the raw imagery contains harsh clutter. In addition, there may be instances when calibration cannot be performed prior to use, and the system must be used in a moment's notice. Moreover, tracking objects using an optical sensor with a telescope and focal plane array on a moving platform presents additional problems, such as, a need to compensate for the movement of the moving platform.

Techniques have been developed to remove FPN in video imagery from imaging and tracking systems, and many of these techniques work quite well for uncluttered or mildly-cluttered imagery. But it may be desirable to have an apparatus and method that improves upon these techniques for imagery with harsher clutter.

BRIEF SUMMARY

Example implementations of the present disclosure are directed to an improved apparatus, method and computer-readable storage medium for suppressing clutter in video imagery. Example implementations of the present disclosure utilize a recursive motion compensated integration technique to recursively suppress independently moving clutter patterns (or fields) in video imagery, one (but not the only one) of which may be FPN. Example implementations of the present disclosure provide a technical approach for recursively removing clutter patterns in video imagery in a manner that results in superior target detection, especially for dim targets. The suppressed clutter in the video imagery enables the detection of otherwise hard-to-detect targets obscured by even harsh clutter.

The present disclosure thus includes, without limitation, the example implementations described below.

Some example implementations provide a method of suppressing clutter in video imagery, the method comprising receiving video imagery from a focal plane array; decomposing the video imagery into independently-moving coordinate transformations corresponding to clutter patterns that are subimages of the video imagery; removing the subimages from an image of the video imagery to produce a clutter-suppressed version of the image, including: generating respective zeroth-order corrections for the subimages, and subtracting the respective zeroth-order corrections from the image; and recursively generating respective first-order corrections for the subimages from the respective zeroth-order corrections, and subtracting the respective first-order corrections from the image, wherein the respective zeroth-order corrections are generated and subtracted from the image before the respective first-order corrections are generated and subtracted from the image; and rendering the clutter-suppressed version of the image.

In some example implementations of the method of the preceding or any subsequent example implementation, or any combination thereof, decomposing the video imagery includes decomposing the video imagery into the independently-moving coordinate transformations corresponding to clutter patterns, one of which is fixed pattern noise associated with the focal plane array.

In some example implementations of the method of any preceding or any subsequent example implementation, or any combination thereof, the image is an image of a kth frame of the video imagery, removing the subimages includes removing the subimages including an mth subimage from the image of the kth frame, and generating the respective zeroth-order corrections comprises generating a zeroth-order correction for the mth subimage of the kth frame, including: removing the DC component from each of N successive images of N successive frames of the video imagery up to and including the kth frame, and thereby producing N successive DC-removed images; transforming the N successive DC-removed images using respective coordinate transformations of the mth subimage from the N successive frames to the kth frame, and thereby producing N transformed images; and accumulating and normalizing the N transformed images to obtain the zeroth-order correction for the mth subimage of the kth frame.

In some example implementations of the method of any preceding or any subsequent example implementation, or any combination thereof, the subimages are M subimages, the image is an image of a kth frame of the video imagery, and removing the subimages includes removing the subimages including an mth subimage from the image of the kth frame, and wherein recursively generating the respective first-order corrections includes recursively generating a first-order correction for the mth subimage of the kth frame from the respective zeroth-order corrections for all M subimages of the kth frame.

In some example implementations of the method of any preceding or any subsequent example implementation, or any combination thereof, recursively generating the first-order correction for the mth subimage of the kth frame includes: independently for each subimage excluding the mth subimage: separately transforming the zeroth-order correction for the subimage using a plurality of coordinate transformations each of which is a combination of a coordinate transformation of the subimage from a kth frame of N successive frames of the video imagery to a qth frame of the N successive frames, and a coordinate transformation of the mth subimage from the qth frame to the kth frame, the plurality of coordinate transformations including values of q from 1 to N, separately transforming the zeroth-order correction producing N transformed zeroth-order corrections for the subimage; and accumulating, normalizing and negating the N transformed zeroth-order corrections for the subimage, and thereby producing an accumulated, normalized and negated zeroth-order correction for the subimage; and accumulating the accumulated, normalized and negated zeroth-order correction for the M subimages excluding the mth subimage to obtain the first-order correction for the mth subimage of the kth frame.

In some example implementations of the method of any preceding or any subsequent example implementation, or any combination thereof, recursively generating respective first-order corrections includes recursively generating respective first and higher-order corrections for the subimages, and subtracting the respective first-order corrections from the image includes subtracting the respective first and higher-order corrections from the image, and wherein for n≥0, respective (n+1)st-order corrections are generated from respective nth-order corrections, and the respective nth-order corrections are generated and subtracted from the image before the respective (n+1)st-order corrections are generated and subtracted from the image.

In some example implementations of the method of any preceding or any subsequent example implementation, or any combination thereof, the subimages are M subimages, the image is an image of a kth frame of the video imagery, and removing the subimages includes removing the subimages including an mth subimage from the image of the kth frame, and wherein recursively generating the respective first and higher-order corrections includes recursively generating a (n+1)st-order correction for the mth subimage of the kth frame from the respective nth-order corrections for at least some of the M subimages of the kth frame.

In some example implementations of the method of any preceding or any subsequent example implementation, or any combination thereof, recursively generating the (n+1)st-order correction for the mth subimage of the kth frame includes: independently for each subimage of at least some of the M subimages: separately transforming the nth-order correction for the subimage using a plurality of coordinate transformations each of which is a combination of a coordinate transformation of the subimage from a kth frame of N successive frames of the video imagery to a qth frame of the N successive frames, and a coordinate transformation of the mth subimage from the qth frame to the kth frame, the plurality of coordinate transformations including values of q from 1 to N, separately transforming the nth-order correction producing N transformed nth-order corrections for the subimage; and accumulating, normalizing and negating the N transformed nth-order corrections for the subimage, and thereby producing an accumulated, normalized and negated nth-order correction for the subimage; and accumulating the accumulated, normalized and negated nth-order correction for the at least some of the M subimages to obtain an accumulation that is the (n+1)st-order correction for the mth subimage of the kth frame, or that is from which the (n+1)st-order correction for the mth subimage of the kth frame is obtained.

In some example implementations of the method of any preceding or any subsequent example implementation, or any combination thereof, the at least some of the M subimages are all of the M subimages, and recursively generating the (n+1)st-order correction for the mth subimage of the kth frame further includes subtracting the accumulated, normalized and negated nth-order correction for the mth subimage from the accumulation to obtain the (n+1)st-order correction for the mth subimage of the kth frame.

Some example implementations provide an apparatus for suppressing clutter in video imagery, the apparatus comprising a processor configured to cause the apparatus perform a number of operations, including the apparatus being caused to at least perform the method of any preceding example implementation, or any combination thereof.

Some example implementations provide a computer-readable storage medium for suppressing clutter in video imagery, the computer-readable storage medium being non-transitory and having computer-readable program code portions stored therein that in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIG. 1 schematically illustrates a recursive motion compensation integration (RMCI) system, in accordance with example implementations of the present disclosure;

DETAILED DESCRIPTION

Figure 1:
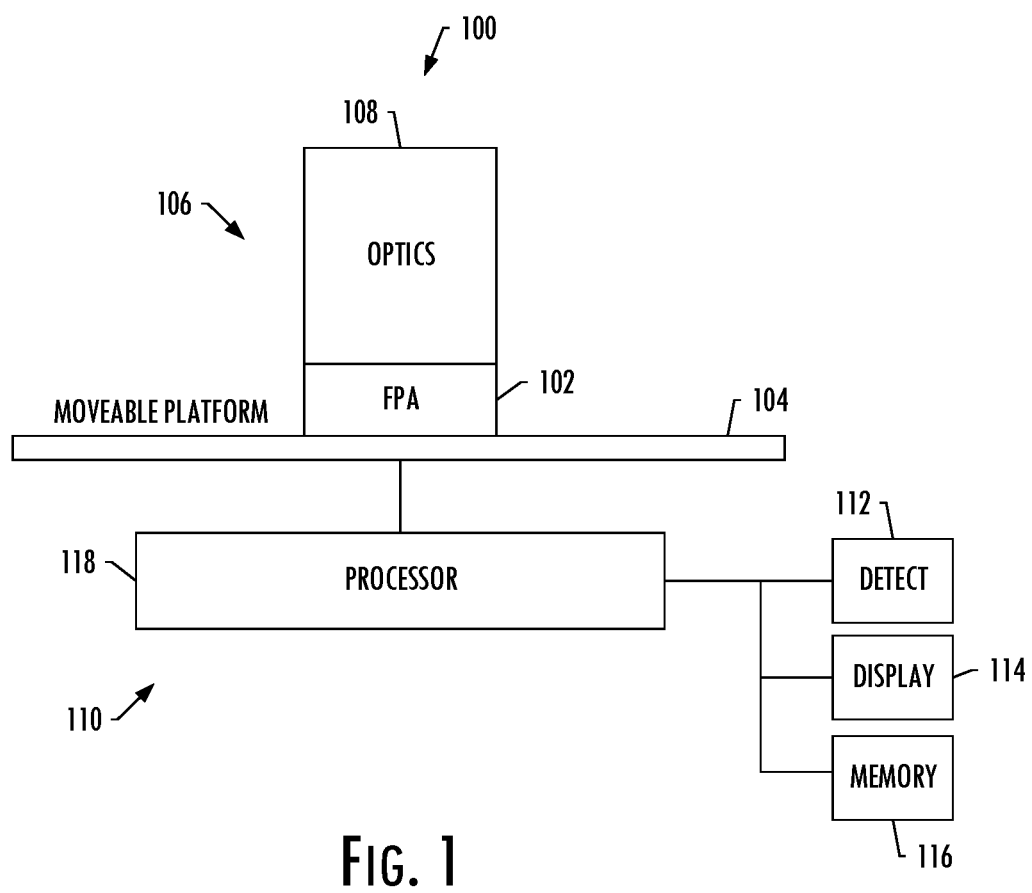

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more, if not all, of these may be absolute or approximate to account for acceptable variations that may occur, such as those due to engineering tolerances or the like. Like reference numerals refer to like elements throughout.

Example implementations of the present disclosure are directed to imaging and tracking and, in particular, to suppression of clutter in video imagery using recursive motion compensation integration (RMCI), and thereby enabling the detection of otherwise hard-to-detect targets obscured by the clutter. According to example implementations, the imagery acquired by a focal plane array (FPA) is decomposed into independently moving coordinate transformations corresponding to clutter patterns (or fields) that are subimages, each of which is recursively suppressed using detailed information regarding all the subimage motions through the FPA.

For example, suppose the video is recorded from a moving aerial platform looking down at the ground through a thin cloud layer, and that the ground and the cloud layer have different motions through the FPA. In this case, the ground terrain forms one subimage, and the cloud layer forms another subimage. If the FPA contains noticeable fixed pattern noise (FPN), then the FPN forms yet another subimage with zero motion.

Example implementations remove each subimage recursively from any desired FPA image by subtracting successive subimage corrections. First, a zeroth order subimage correction is generated for each clutter pattern (subimage) and subtracted from the desired FPA image. Then additional corrections are generated recursively and also subtracted from the desired FPA image. In this regard, first order subimage corrections are calculated from the zeroth order corrections, and subtracted. Second order subimage corrections are then calculated from the first order corrections, and subtracted. And so forth for higher order subimage corrections. The clutter suppression improves with each recursion. The clutter is suppressed a lot with the zeroth order corrections, then substantially more with the first order corrections, then noticeably more with the second order corrections, etc. The successive corrections get smaller and smaller until, eventually, the process reaches a desired amount of removal of the subimages.

FIG. 1 schematically illustrates a RMCI system 100, in accordance with example implementations of the present disclosure. As shown, in some examples, the RMCI system includes an image sensing device such as a focal plane array (FPA) 102 fixedly mounted to a moveable platform 104. Examples of a suitable moveable platform include vehicles such as land vehicles (ground vehicles), rail vehicles, aircraft (air vehicles), spacecraft, watercraft and the like. Other examples of a suitable moveable platform include satellites, missiles, advanced kill vehicles and the like.

In some examples, FPA 102 is a component of an optical sensor 106 that also includes a set of optics 108. For example, the set of optics may be part of a telescope and include one or more lenses, reflectors or the like. The FPA may include a physical array of detectors configured to detect infrared or other wavelengths focused through the set of optics, and generate focal plane array data—or more particularly video imagery—indicative of the same. For example, the detectors of the focal plane array may comprise long band detectors and/or short band detectors, although other types of detectors, such as visible detectors, may be used.

As also shown, in some examples, the RMCI system 100 includes a computing apparatus 110 in communication with the FPA 102 and generally configured to suppress clutter in video imagery from the FPA to produce a clutter-suppressed version of the video imagery. The computing apparatus is configured to render the clutter-suppressed version of the video imagery for receipt by a target detection processor 112, presentation by a display 114 and/or storage in non-volatile memory 116, any one or more of which may be integrated with or separate from the computing apparatus. The computing apparatus includes one or more of each of one or more components such as a processor 118, one suitable example of which is a field programmable gate array (FPGA). A suitable computing apparatus according to various example implementations is described in greater detail below.

In accordance with example implementations of the present disclosure, the processor 118 is configured to cause the computing apparatus 110 (at times more simply referred to as an "apparatus") to perform a number of operations. In this regard, the apparatus is caused to receive video imagery from the FPA 102, decompose the video imagery into independently-moving coordinate transformations corresponding to clutter patterns that are subimages of the video imagery, and remove the subimages from an image of the video imagery to produce a clutter-suppressed version of the image. In some examples, one of these independently-moving clutter patterns is fixed pattern noise (FPN) associated with the FPA. The apparatus is then caused to render the clutter-suppressed version of the image, such as for receipt by the target detection processor 112, presentation by the display 114 and/or storage in the non-volatile memory 116.

In removal of the subimages from the image of video imagery from the FPA 102, the processor 118 is configured to cause the computing apparatus 110 to at least generate respective zeroth-order corrections for the subimages, and subtract the respective zeroth-order corrections from the image. Also, the processor is configured to cause the apparatus to recursively generate respective first-order corrections for the subimages from the respective zeroth-order corrections, and subtract the respective first-order corrections from the image. In accordance with example implementations, the respective zeroth-order corrections are generated and subtracted from the image before the respective first-order corrections are generated and subtracted from the image.

Although the video imagery may include any number of images of any number of frames, various example implementations are described below in which the image is an image of an arbitrary kth frame of the video imagery. Similarly, although the subimages may include any number of subimages, various example implementations are described below in which the subimages include an arbitrary nth subimage of perhaps M subimages. As described below, then, in some examples, the computing apparatus 110 is caused to remove the subimages including the mth subimage from the image of the kth frame.

Figure 2:
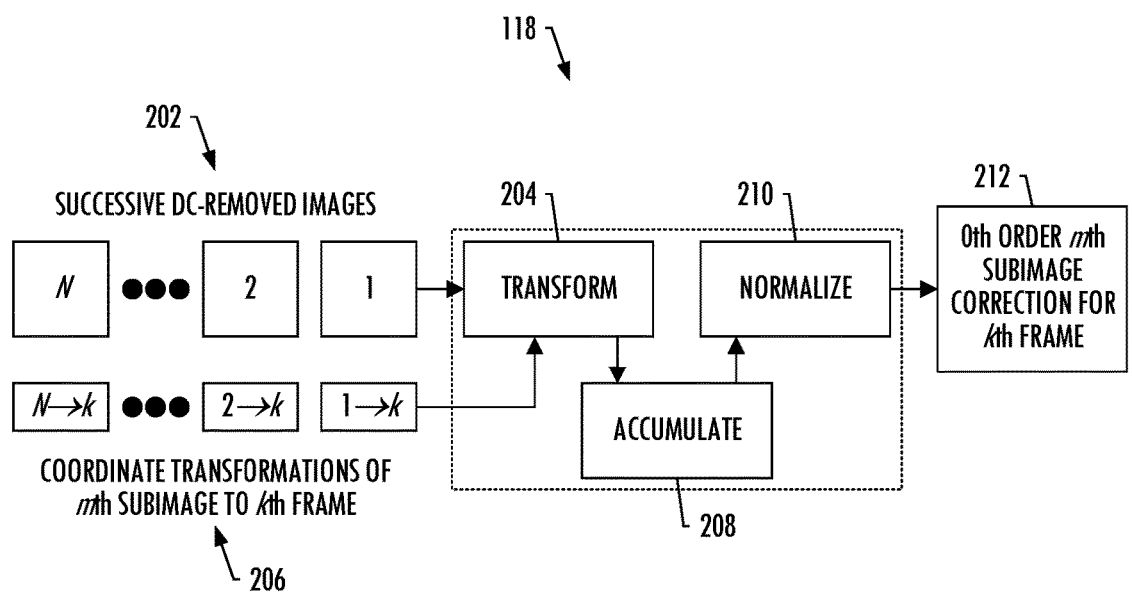
FIG. 2 is a functional block diagram of a processor of a computing apparatus configured to cause the computing apparatus to generate a zeroth-order correction for an mth subimage of a kth frame of video imagery, according to some example implementations.

FIG. 2 is a functional block diagram of the processor 118 of the computing apparatus 110 being configured to cause the apparatus to generate a zeroth-order correction for the mth subimage of the kth frame, according to some example implementations. This includes the apparatus being caused to remove the DC component (the arithmetic mean) from each of N successive images of N successive frames of the video imagery up to and including the kth frame, and thereby producing N successive DC-removed images 202.

The computing apparatus 110 is caused to transform 204 the N successive DC-removed images using respective coordinate transformations 206 of the mth subimage from the N successive frames to the kth frame, and thereby produce N transformed images. The respective coordinate transformations may be specified in any of a number of different manners, such as in terms of a mathematical affine transformation or in terms of image optical flow offsets. Likewise, the respective coordinate transformations may be obtained in any of a number of different manners, such as by a combination of navigational data (e.g., geolocation) and external environment geometry that may be obtained by the moveable platform 104, or by the direct measurement of subimage motion within the imagery. Regardless of how the respective coordinate transformations are obtained or specified, the N transformed images are then accumulated 208 and normalized 210 to obtain the zeroth-order correction 212 for the mth subimage of the kth frame.

In some examples, the computing apparatus 110 is caused to recursively generate the first-order correction for the mth subimage of the kth frame from the respective zeroth-order corrections for all M subimages of the kth frame. In some more particular examples, this includes, independently for each subimage excluding the mth subimage, the computing apparatus being caused to separately transform the zeroth-order correction for the subimage using a plurality of coordinate transformations to produce transformed zeroth-order corrections for the subimage, and accumulate, normalize and negate the N transformed zeroth-order corrections for the subimage, and thereby produce an accumulated, normalized and negated zeroth-order correction for the subimage. This accumulated, normalized and negated zeroth-order correction is accumulated for the M subimages excluding the mth subimage to obtain the first-order correction for the mth subimage of the kth frame.

Each of the plurality of coordinate transformations for the subimage is a combination of a coordinate transformation of the subimage from a kth frame of N successive frames of the video imagery to a qth frame of the N successive frames, and a coordinate transformation of the mth subimage from the qth frame to the kth frame. The plurality of coordinate transforms includes values of q from 1 to N, separately transforming the zeroth-order correction producing N transformed zeroth-order corrections for the subimage. These N transformed zeroth-order corrections for the subimage are then accumulated, normalized and negated to produce the accumulated, normalized and negated zeroth-order correction for the subimage.

In some examples, the apparatus being caused to recursively generate respective first-order corrections includes being caused to recursively generate respective first and higher-order corrections for the subimages. In these examples, the apparatus is also caused to subtract the respective first-order corrections from the image including being caused to subtract the respective first and higher-order corrections from the image. For an arbitrary n≥0, respective (n+1)st-order corrections are generated from respective nth-order corrections, and the respective nth-order corrections are generated and subtracted from the image before the respective (n+1)st-order corrections are generated and subtracted from the image. In some further examples, the computing apparatus 110 being caused to recursively generate the respective first and higher-order corrections includes being caused to recursively generate a (n+1)st-order correction for the mth subimage of the kth frame from the respective nth-order corrections for at least some of the M subimages of the kth frame.

Figure 3:
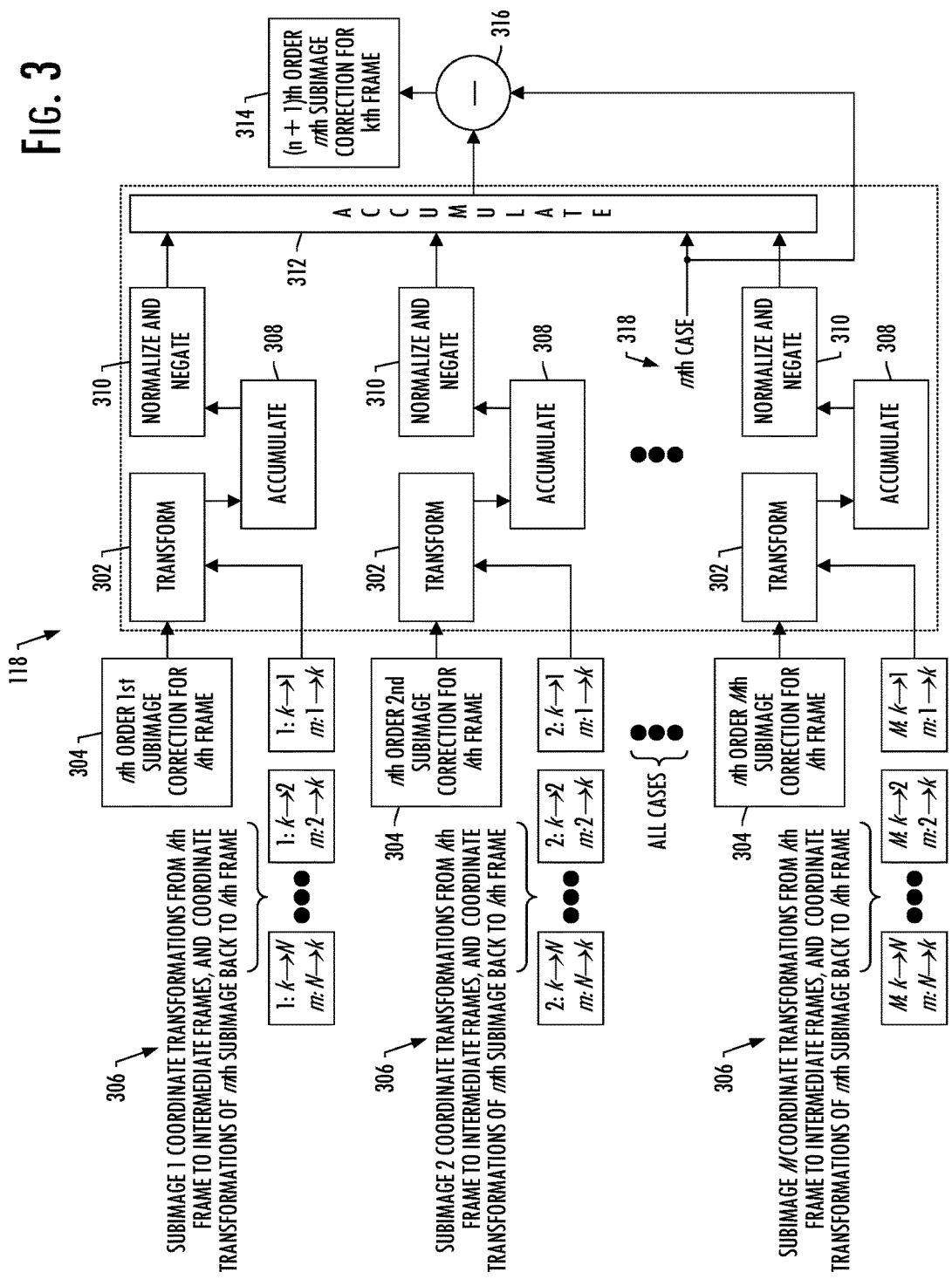
FIG. 3 is a functional block diagram of the processor of the computing apparatus configured to cause the computing apparatus to generate an (n+1)st-order correction for the mth subimage of the kth frame, according to some example implementations.

FIG. 3 is a functional block diagram of the processor 118 of the computing apparatus 110 being configured to cause the apparatus to generate an (n+1)st-order correction for the mth subimage of the kth frame, according to some example implementations. As shown, in some examples, this includes, independently for each subimage of at least some of the M subimages, the apparatus being caused to separately transform 302 the nth-order correction 304 for the subimage using a plurality of coordinate transformations 306. As before, each of these coordinate transformations is a combination of a coordinate transformation of the subimage from a kth frame of N successive frames of the video imagery to a qth frame of the N successive frames, and a coordinate transformation of the mth subimage from the qth frame to the kth frame. The plurality of coordinate transforms include values of q from 1 to N, separately transforming the nth-order correction producing N transformed nth-order corrections for the subimage.

Also independently for each subimage of at least some of the M subimages, the computing apparatus 110 is caused to accumulate 308, normalize and negate 310 the N transformed nth-order corrections for the subimage, and thereby produce an accumulated, normalized and negated nth-order correction for the subimage.

The computing apparatus 110 is caused to accumulate 312 the accumulated, normalized and negated nth-order correction for the at least some of the M subimages to obtain an accumulation that is the (n+1)st-order correction 314 for the mth subimage of the kth frame, or that is from which the (n+1)st-order correction for the mth subimage of the kth frame is obtained. In this regard, in some examples, the at least some of the M subimages are all of the M subimages. In these examples, the apparatus being caused to recursively generate the (n+1)st-order correction further includes being caused to subtract 316 the accumulated, normalized and negated nth-order correction 318 for the mth subimage from the accumulation to obtain the (n+1)st-order correction for the mth subimage of the kth frame.

Computationally, the recursive generation of respective first and higher-order corrections for the subimages is highly parallelizable. As seen in FIG. 3, each of the computational chains (including 302-310) feeding into accumulation 312 of the accumulated, normalized and negated nth-order corrections to produce the final accumulation at the right of the figure is entirely independent from the others. Given appropriate processing hardware, each of these computational chains may be simultaneously performed. Likewise, after accumulation of the accumulated, normalized and negated nth-order corrections, each subtraction from the accumulation to obtain the (n+1)st-order correction is also independent of the others. So, this could, in principle, also be performed in parallel.

Figure 4:
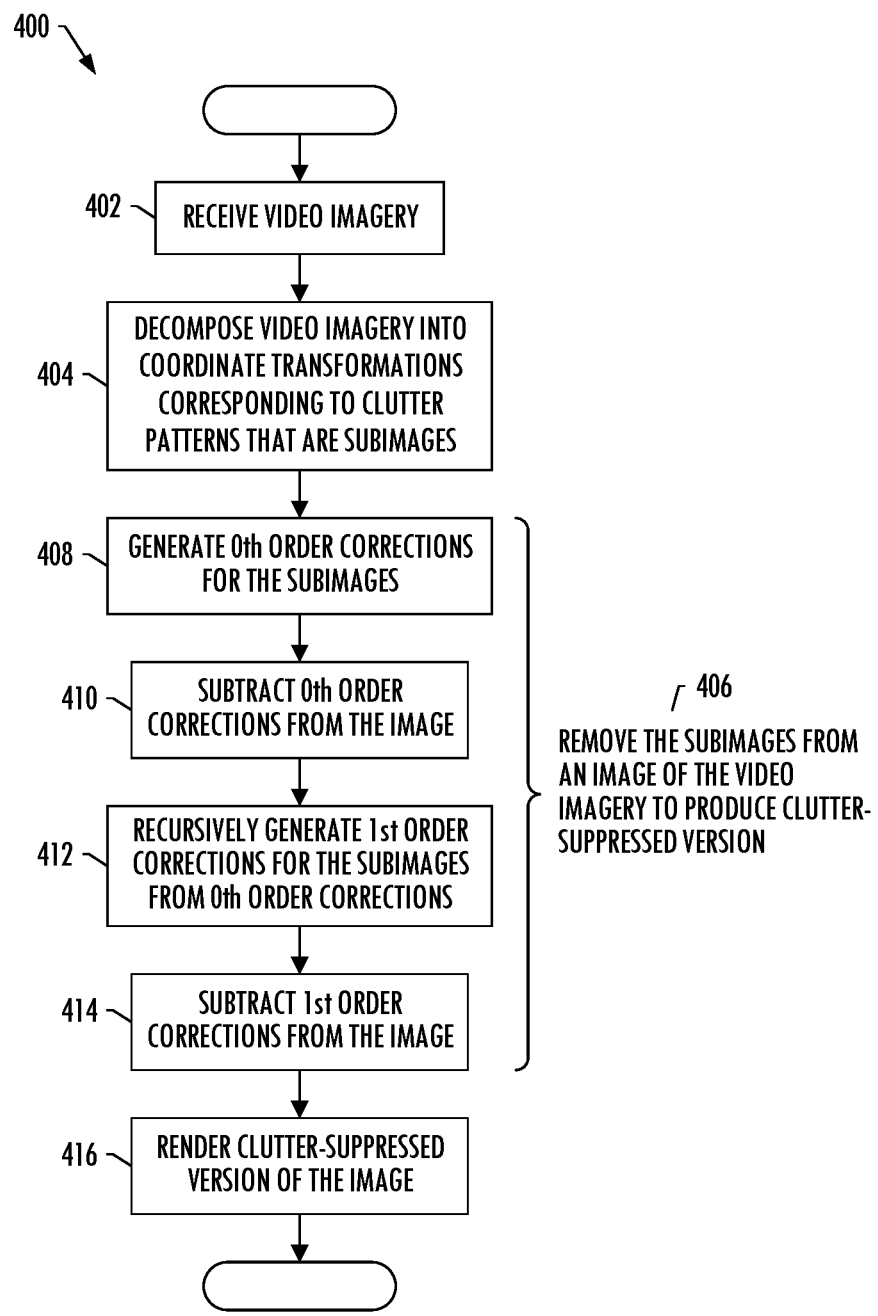
FIG. 4 illustrates a flowchart including various operations of a method of suppressing clutter in video imagery, according to some example implementations.

FIG. 4 illustrates a flowchart including various operations of a method 400 of suppressing clutter in video imagery, according to some example implementations of the present disclosure. As shown at blocks 402 and 404, the method includes receiving video imagery from a FPA 102, and decomposing the video imagery into independently-moving coordinate transformations corresponding to clutter patterns that are subimages of the video imagery. As shown at 406, the method also includes removing the subimages from an image of the video imagery to produce a clutter-suppressed version of the image.

The removal of the subimages includes generating respective zeroth-order corrections for the subimages, and subtracting the respective zeroth-order corrections from the image, as shown at blocks 408 and 410. The removal also includes recursively generating respective first-order corrections for the subimages from the respective zeroth-order corrections, and subtracting the respective first-order corrections from the image, as shown at blocks 412 and 414. As shown, the respective zeroth-order corrections are generated and subtracted from the image before the respective first-order corrections are generated and subtracted from the image. The method also includes rendering the clutter-suppressed version of the image, as shown at block 416.

As explained above, the computing apparatus 110 includes one or more of each of one or more components such as a processor 118, one suitable example of which is an FPGA. In some examples, the processor is implemented using FPGAs for most of the image processing because of their extreme speed for many image processing operations. This type of hardware implementation is very appropriate for real-time clutter suppression in high-speed video imagery, but it is not the only possible hardware implementation. The computing apparatus may, in fact, be implemented by various means, including hardware, alone or under direction of one or more computer programs from a computer-readable storage medium. In some example implementations, the computing apparatus includes and makes extensive use of graphics processing units (GPUs), which are designed to process many coordinate transformations in parallel.

In some examples, one or more apparatuses may be provided that are configured to function as, or otherwise implement, the computing apparatus 110 shown and described herein. In examples involving more than one apparatus, the respective apparatuses may be connected to, or otherwise be in communication with, one another in a number of different manners, such as directly or indirectly via a wired or wireless network or the like.

Figure 5:
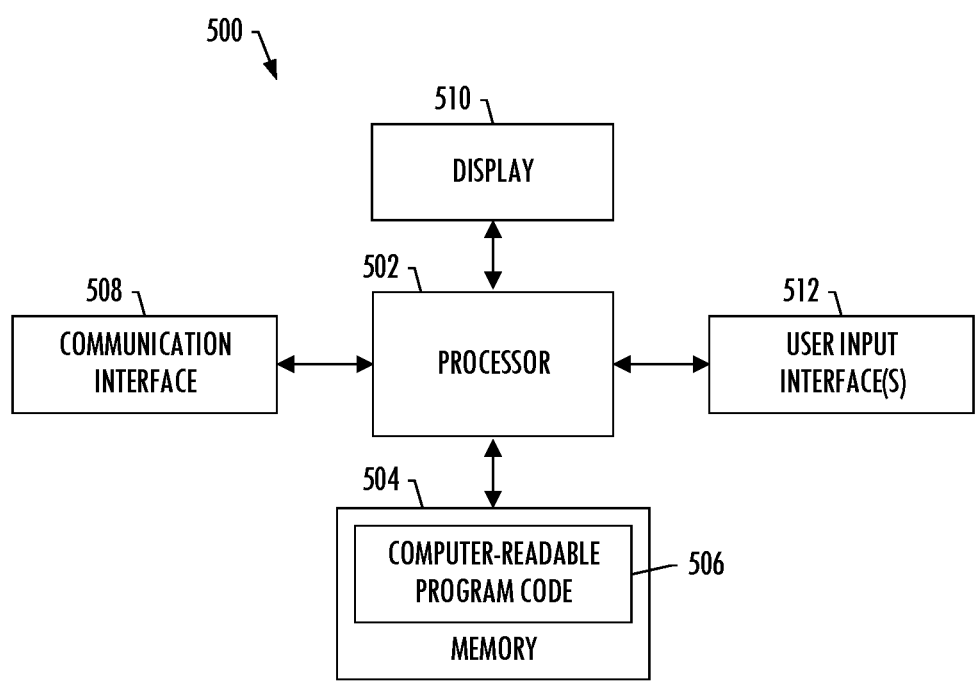
FIG. 5 illustrates an apparatus that may correspond to the computing apparatus according to some example implementations.

FIG. 5 more particularly illustrates an apparatus 500 that in some examples may correspond to the computing apparatus 110. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 502 (e.g., processor 118) connected to a memory 504 (e.g., storage device).

The processor 502 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 504 (of the same or another apparatus).

The processor 502 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), FPGAs or the like. Thus, although the processor may be capable of executing a computer program to perform one or more functions, the processor of various examples may be capable of performing one or more functions without the aid of a computer program.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communication interface 508 (e.g., communications unit) and/or one or more user interfaces. The communication interface may be configured to transmit and/or receive information, such as to and/or from other apparatus(es), network(s) or the like. The communication interface may be configured to transmit and/or receive information by physical (wired) and/or wireless communications links. Examples of suitable communication interfaces include a network interface controller (NIC), wireless NIC (WNIC) or the like.

The user interfaces may include a display 510 (e.g., display 114) and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like.

The user input interfaces 512 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 502 and a computer-readable storage medium or memory 504 coupled to the processor, where the processor is configured to execute computer-readable program code 506 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for suppressing clutter in video imagery, the apparatus comprising:
a processor configured to cause the apparatus to perform a number of operations, including the apparatus caused to at least:
receive video imagery from a focal plane array;
decompose the video imagery into independently-moving coordinate transformations corresponding to clutter patterns that are subimages of the video imagery;
remove the subimages from an image of the video imagery to produce a clutter-suppressed version of the image, including:
generate respective zeroth-order corrections for the subimages, and subtract the respective zeroth-order corrections from the image; and
recursively generate respective first-order corrections for the subimages from the respective zeroth-order corrections, and subtract the respective first-order corrections from the image, wherein the respective zeroth-order corrections are generated and subtracted from the image before the respective first-order corrections are generated and subtracted from the image; and
render the clutter-suppressed version of the image.

2. The apparatus of claim 1, wherein decompose the video imagery includes the apparatus caused to decompose the video imagery into the independently-moving coordinate transformations corresponding to clutter patterns, one of which is fixed pattern noise associated with the focal plane array.

3. The apparatus of claim 1, wherein the image is an image of a kth frame of the video imagery, remove the subimages includes the apparatus caused to remove the subimages including an mth subimage from the image of the kth frame, and generate the respective zeroth-order corrections comprises the apparatus caused to generate a zeroth-order correction for the mth subimage of the kth frame, including:
remove the DC component from each of N successive images of N successive frames of the video imagery up to and including the kth frame, and thereby produce N successive DC-removed images;
transform the N successive DC-removed images using respective coordinate transformations of the mth subimage from the N successive frames to the kth frame, and thereby produce N transformed images; and
accumulate and normalize the N transformed images to obtain the zeroth-order correction for the mth subimage of the kth frame.

4. The apparatus of claim 1, wherein the subimages are M subimages, the image is an image of a kth frame of the video imagery, and remove the subimages includes the apparatus caused to remove the subimages including an mth subimage from the image of the kth frame, and
wherein recursively generate the respective first-order corrections includes the apparatus caused to recursively generate a first-order correction for the mth subimage of the kth frame from the respective zeroth-order corrections for all M subimages of the kth frame.

5. The apparatus of claim 4, wherein recursively generate the first-order correction for the mth subimage of the kth frame includes the apparatus further caused to at least:
independently for each subimage excluding the mth subimage:
separately transform the zeroth-order correction for the subimage using a plurality of coordinate transformations each of which is a combination of a coordinate transformation of the subimage from a kth frame of N successive frames of the video imagery to a qth frame of the N successive frames, and a coordinate transformation of the mth subimage from the qth frame to the kth frame, the plurality of coordinate transformations including values of q from 1 to N, separately transforming the zeroth-order correction producing N transformed zeroth-order corrections for the subimage; and accumulate, normalize and negate the N transformed zeroth-order corrections for the subimage, and thereby produce an accumulated, normalized and negated zeroth-order correction for the subimage; and accumulate the accumulated, normalized and negated zeroth-order correction for the M subimages excluding the mth subimage to obtain the first-order correction for the mth subimage of the kth frame.

6. The apparatus of claim 1, wherein recursively generate respective first-order corrections includes the apparatus caused to recursively generate respective first and higher-order corrections for the subimages, and subtract the respective first-order corrections from the image includes the apparatus caused to subtract the respective first and higher-order corrections from the image, and wherein for $n \geq 0$, respective (n+1)st-order corrections are generated from respective nth-order corrections, and the respective nth-order corrections are generated and subtracted from the image before the respective (n+1)st-order corrections are generated and subtracted from the image.

7. The apparatus of claim 6, wherein the subimages are M subimages, the image is an image of a kth frame of the video imagery, and remove the subimages includes the apparatus caused to remove the subimages including an mth subimage from the image of the kth frame, and wherein recursively generate the respective first and higher-order corrections includes the apparatus caused to recursively generate a (n+1)st-order correction for the mth subimage of the kth frame from the respective nth-order corrections for at least some of the M subimages of the kth frame.

8. The apparatus of claim 7, wherein recursively generate the (n+1)st-order correction for the mth subimage of the kth frame includes the apparatus further caused to at least:

independently for each subimage of at least some of the M subimages:

separately transform the nth-order correction for the subimage using a plurality of coordinate transformations each of which is a combination of a coordinate transformation of the subimage from a kth frame of N successive frames of the video imagery to a qth frame of the N successive frames, and a coordinate transformation of the mth subimage from the qth frame to the kth frame, the plurality of coordinate transformations including values of q from 1 to N, separately transforming the nth-order correction producing N transformed nth-order corrections for the subimage; and accumulate, normalize and negate the N transformed nth-order corrections for the subimage, and thereby produce an accumulated, normalized and negated nth-order correction for the subimage; and accumulate the accumulated, normalized and negated nth-order correction for the at least some of the M subimages to obtain an accumulation that is the (n+1)st-order correction for the mth subimage of the kth frame, or that is from which the (n+1)st-order correction for the mth subimage of the kth frame is obtained.

9. The apparatus of claim 8, wherein the at least some of the M subimages are all of the M subimages, and recursively generate the (n+1)st-order correction for the mth subimage of the kth frame further includes the apparatus caused to subtract the accumulated, normalized and negated nth-order correction for the mth subimage from the accumulation to obtain the (n+1)st-order correction for the mth subimage of the kth frame.

10. A method of suppressing clutter in video imagery, the method comprising:

receiving video imagery from a focal plane array;

decomposing the video imagery into independently-moving coordinate transformations corresponding to clutter patterns that are subimages of the video imagery;

removing the subimages from an image of the video imagery to produce a clutter-suppressed version of the image, including:

generating respective zeroth-order corrections for the subimages, and subtracting the respective zeroth-order corrections from the image; and recursively generating respective first-order corrections for the subimages from the respective zeroth-order corrections, and subtracting the respective first-order corrections from the image, wherein the respective zeroth-order corrections are generated and subtracted from the image before the respective first-order corrections are generated and subtracted from the image; and rendering the clutter-suppressed version of the image.

11. The method of claim 10, wherein decomposing the video imagery includes decomposing the video imagery into the independently-moving coordinate transformations corresponding to clutter patterns, one of which is fixed pattern noise associated with the focal plane array.

12. The method of claim 10, wherein the image is an image of a kth frame of the video imagery, removing the subimages includes removing the subimages including an mth subimage from the image of the kth frame, and generating the respective zeroth-order corrections comprises generating a zeroth-order correction for the mth subimage of the kth frame, including:

removing the DC component from each of N successive images of N successive frames of the video imagery up to and including the kth frame, and thereby producing N successive DC-removed images;

transforming the N successive DC-removed images using respective coordinate transformations of the mth subimage from the N successive frames to the kth frame, and thereby producing N transformed images; and accumulating and normalizing the N transformed images to obtain the zeroth-order correction for the mth subimage of the kth frame.

13. The method of claim 10, wherein the subimages are M subimages, the image is an image of a kth frame of the video imagery, and removing the subimages includes removing the subimages including an mth subimage from the image of the kth frame, and wherein recursively generating the respective first-order corrections includes recursively generating a first-order correction for the mth subimage of the kth frame from the respective zeroth-order corrections for all M subimages of the kth frame.

14. The method of claim 13, wherein recursively generating the first-order correction for the mth subimage of the kth frame includes:

independently for each subimage excluding the mth subimage:

separately transforming the zeroth-order correction for the subimage using a plurality of coordinate transformations each of which is a combination of a coordinate transformation of the subimage from a kth frame of N successive frames of the video imagery to a qth frame of the N successive frames, and a coordinate transformation of the mth subimage from the qth frame to the kth frame, the plurality of coordinate transformations including values of q from 1 to N, separately transforming the zeroth-order correction producing N transformed zeroth-order corrections for the subimage; and accumulating, normalizing and negating the N transformed zeroth-order corrections for the subimage, and thereby producing an accumulated, normalized and negated zeroth-order correction for the subimage; and accumulating the accumulated, normalized and negated zeroth-order correction for the M subimages excluding the mth subimage to obtain the first-order correction for the mth subimage of the kth frame.

15. The method of claim 10, wherein recursively generating respective first-order corrections includes recursively generating respective first and higher-order corrections for the subimages, and subtracting the respective first-order corrections from the image includes subtracting the respective first and higher-order corrections from the image, and wherein for $n \geq 0$, respective (n+1)st-order corrections are generated from respective nth-order corrections, and the respective nth-order corrections are generated and subtracted from the image before the respective (n+1)st-order corrections are generated and subtracted from the image.

16. The method of claim 15, wherein the subimages are M subimages, the image is an image of a kth frame of the video imagery, and removing the subimages includes removing the subimages including an mth subimage from the image of the kth frame, and wherein recursively generating the respective first and higher-order corrections includes recursively generating a (n+1)st-order correction for the mth subimage of the kth frame from the respective nth-order corrections for at least some of the M subimages of the kth frame.

17. The method of claim 16, wherein recursively generating the (n+1)st-order correction for the mth subimage of the kth frame includes:

independently for each subimage of at least some of the M subimages:

separately transforming the nth-order correction for the subimage using a plurality of coordinate transformations each of which is a combination of a coordinate transformation of the subimage from a kth frame of N successive frames of the video imagery to a qth frame of the N successive frames, and a coordinate transformation of the mth subimage from the qth frame to the kth frame, the plurality of coordinate transformations including values of q from 1 to N, separately transforming the nth-order correction producing N transformed nth-order corrections for the subimage; and accumulating, normalizing and negating the N transformed nth-order corrections for the subimage, and thereby producing an accumulated, normalized and negated nth-order correction for the subimage; and accumulating the accumulated, normalized and negated nth-order correction for the at least some of the M subimages to obtain an accumulation that is the (n+1)st-order correction for the mth subimage of the kth frame, or that is from which the (n+1)st-order correction for the mth subimage of the kth frame is obtained.

18. The method of claim 17, wherein the at least some of the M subimages are all of the M subimages, and recursively generating the (n+1)st-order correction for the mth subimage of the kth frame further includes subtracting the accumulated, normalized and negated nth-order correction for the mth subimage from the accumulation to obtain the (n+1)st-order correction for the mth subimage of the kth frame.

19. A non-transitory computer-readable storage medium for suppressing clutter in video imagery, the non-transitory computer-readable storage medium having computer-readable program code portions stored therein that in response to execution by a processor, cause an apparatus to at least:

receive video imagery from a focal plane array;

decompose the video imagery into independently-moving coordinate transformations corresponding to clutter patterns that are subimages of the video imagery;

remove the subimages from an image of the video imagery to produce a clutter-suppressed version of the image, including:

generate respective zeroth-order corrections for the subimages, and subtract the respective zeroth-order corrections from the image; and recursively generate respective first-order corrections for the subimages from the respective zeroth-order corrections, and subtract the respective first-order corrections from the image, wherein the respective zeroth-order corrections are generated and subtracted from the image before the respective first-order corrections are generated and subtracted from the image; and render the clutter-suppressed version of the image.

20. The non-transitory computer-readable storage medium of claim 19, wherein decompose the video imagery includes the apparatus caused to decompose the video imagery into the independently-moving coordinate transformations corresponding to clutter patterns, one of which is fixed pattern noise associated with the focal plane array.

21. The non-transitory computer-readable storage medium of claim 19, wherein the image is an image of a kth frame of the video imagery, remove the subimages includes the apparatus caused to remove the subimages including an mth subimage from the image of the kth frame, and generate the respective zeroth-order corrections comprises the apparatus caused to generate a zeroth-order correction for the mth subimage of the kth frame, including:

remove the DC component from each of N successive images of N successive frames of the video imagery up to and including the kth frame, and thereby produce N successive DC-removed images;

transform the N successive DC-removed images using respective coordinate transformations of the mth subimage from the N successive frames to the kth frame, and thereby produce N transformed images; and accumulate and normalize the N transformed images to obtain the zeroth-order correction for the mth subimage of the kth frame.

22. The non-transitory computer-readable storage medium of claim 19, wherein the subimages are M subimages, the image is an image of a kth frame of the video imagery, and remove the subimages includes the apparatus caused to remove the subimages including an mth subimage from the image of the kth frame, and wherein recursively generate the respective first-order corrections includes the apparatus caused to recursively generate a first-order correction for the mth subimage of the kth frame from the respective zeroth-order corrections for all M subimages of the kth frame.

23. The non-transitory computer-readable storage medium of claim 22, wherein recursively generate the first-order correction for the mth subimage of the kth frame includes the apparatus further caused to at least:
  independently for each subimage excluding the mth subimage:
    separately transform the zeroth-order correction for the subimage using a plurality of coordinate transformations each of which is a combination of a coordinate transformation of the subimage from a kth frame of N successive frames of the video imagery to a qth frame of the N successive frames, and a coordinate transformation of the mth subimage from the qth frame to the kth frame, the plurality of coordinate transformations including values of q from 1 to N, separately transforming the zeroth-order correction producing N transformed zeroth-order corrections for the subimage; and
    accumulate, normalize and negate the N transformed zeroth-order corrections for the subimage, and thereby produce an accumulated, normalized and negated zeroth-order correction for the subimage; and
  accumulate the accumulated, normalized and negated zeroth-order correction for the M subimages excluding the mth subimage to obtain the first-order correction for the mth subimage of the kth frame.

24. The non-transitory computer-readable storage medium of claim 19, wherein recursively generate respective first-order corrections includes the apparatus caused to recursively generate respective first and higher-order corrections for the subimages, and subtract the respective first-order corrections from the image includes the apparatus caused to subtract the respective first and higher-order corrections from the image, and
  wherein for n≥0, respective (n+1)st-order corrections are generated from respective nth-order corrections, and the respective nth-order corrections are generated and subtracted from the image before the respective (n+1)st-order corrections are generated and subtracted from the image.

25. The non-transitory computer-readable storage medium of claim 24, wherein the subimages are M subimages, the image is an image of a kth frame of the video imagery, and remove the subimages includes the apparatus caused to remove the subimages including an mth subimage from the image of the kth frame, and
  wherein recursively generate the respective first and higher-order corrections includes the apparatus caused to recursively generate a (n+1)st-order correction for the mth subimage of the kth frame from the respective nth-order corrections for at least some of the M subimages of the kth frame.

26. The non-transitory computer-readable storage medium of claim 25, wherein recursively generate the (n+1)st-order correction for the mth subimage of the kth frame includes the apparatus further caused to at least:
  independently for each subimage of at least some of the M subimages:
    separately transform the nth-order correction for the subimage using a plurality of coordinate transformations each of which is a combination of a coordinate transformation of the subimage from a kth frame of N successive frames of the video imagery to a qth frame of the N successive frames, and a coordinate transformation of the mth subimage from the qth frame to the kth frame, the plurality of coordinate transformations including values of q from 1 to N, separately transforming the nth-order correction producing N transformed nth-order corrections for the subimage; and
    accumulate, normalize and negate the N transformed nth-order corrections for the subimage, and thereby produce an accumulated, normalized and negated nth-order correction for the subimage; and
  accumulate the accumulated, normalized and negated nth-order correction for the at least some of the M subimages to obtain an accumulation that is the (n+1)st-order correction for the mth subimage of the kth frame, or that is from which the (n+1)st-order correction for the mth subimage of the kth frame is obtained.

27. The non-transitory computer-readable storage medium of claim 26, wherein the at least some of the M subimages are all of the M subimages, and recursively generate the (n+1)st-order correction for the mth subimage of the kth frame further includes the apparatus caused to subtract the accumulated, normalized and negated nth-order correction for the mth subimage from the accumulation to obtain the (n+1)st-order correction for the mth subimage of the kth frame.

* * * * *